Apr. 24, 1923.

A. J. BRIGGS 1,452,867

FEEDING AND IMPRINTING MECHANISM FOR MAIL AND OTHER UNITS

Original Filed May 23, 1913

A. J. BRIGGS

1,452,867

FEEDING AND IMPRINTING MECHANISM FOR MAIL AND OTHER UNITS

Original Filed May 23, 1913    7 Sheets-Sheet 2

Fig. 3.

Patented Apr. 24, 1923.

1,452,867

UNITED STATES PATENT OFFICE.

ARTHUR J. BRIGGS, OF SYRACUSE, NEW YORK, ASSIGNOR TO THE AUTO MAIL DISTRIBUTER, INC., OF SYRACUSE, NEW YORK, A CORPORATION OF NEW YORK.

FEEDING AND IMPRINTING MECHANISM FOR MAIL AND OTHER UNITS.

Original application filed May 23, 1913, Serial No. 769,433. Divided and this application filed August 13, 1914, Serial No. 856,305. Renewed July 17, 1922. Serial No. 575,833.

*To all whom it may concern:*

Be it known that I, ARTHUR J. BRIGGS, a citizen of the United States, residing at Syracuse, in the county of Onondaga and State of New York, have invented certain new and useful Improvements in and Relating to Feeding and Imprinting Mechanisms for Mail and Other Units, of which the following is a specification.

This invention relates to certain improvements in and relating to feeding and imprinting mechanisms for mail and other units; and the objects and nature of the invention will be readily understood by those skilled in the art in the light of the following explanation of the accompanying drawings illustrating what I now believe to be the preferred embodiments and mechanical expressions from among other formations, constructions and arrangements within the spirit and scope of the invention.

The invention consists in certain novel features in construction and in combinations and arrangements as more fully and particularly set forth hereinafter.

Referring to the accompanying drawings—

In the particular example illustrated, I show my invention applied to mail distributing apparatus and adapted to successively deliver mail units, such as letters, to the distributing devices. However, my invention is not limited to use in connection with distributing apparatus nor to handling mail units.

In this example, I show the main supporting frame 1, of a distributing case into the boxes or compartments of which the mail units are to be distributed or sorted.

I preferably employ a feed way or hopper 2, for the common pile of letters to be distributed into the case of boxes, arranged horizontally on top of the frame work 1, and extending to the front end portion thereof. This feed way is in the form of a trough or platform open at the top and front end and usually at the front side and provided with a follower 3, constantly being pressed forward by flexible connection 4, to feed the pile of letters forwardly in said way toward the open front end thereof. This way is movably supported on the frame work by rollers 5, or other means, to permit limited longitudinal reciprocation thereof.

I show a spring actuated drum $4^a$, (carried by bracket $4^b$) constantly acting to wind the cord 4, thereon. The cord extends from the drum longitudinally of the hopper through a slot or passage therein to a pulley $4^c$, at the front end of the hopper and from thence rearwardly to the follower so as to constantly act on the follower to pull the same forwardly.

The letters to be distributed are faced upon a suitable table and arranged in a horizontal pile, and are then placed in the way with their lower longitudinal edges resting on the floor of the way and their rear ends lined up against the inner or rear side wall of the way. In this instance, the letters are arranged in the way with their addressed faces to the rear and the stamps at the lower end or rear corners thereof.

Mechanism is provided to successively receive the letters from the front end of said way and present the same to imprinting means, and then bring the imprinted addressed face of the letter into position for inspection or reading by the operator, and then deliver the imprinted inspected letter to means for distributing the same to the box indicated or predestined by an action of the operator performed while the letter was held in position for his inspection.

In the present example, I show a horizontally-arranged vertically-rotatory hollow drum, head or turret arranged in advance of the open front end of the feed way and carried by and rotating with a horizontal shaft 8, arranged transversely with respect to the feed way and carried by standards or pillars 9, fixed to and rising from the frame work. This transversely arranged turret is hollow and open at one end and consists of an end head or spider 7, fixed to one end portion of the shaft 8, near the rear side of the machine, and a concentric circumferential portion at one end fixed to said head and projecting therefrom toward the front side of the machine and longitudinally with respect to shaft 8, and this circumferential portion consists of parallel longitudinal bars 7', carried by said head and at corresponding ends fixed thereto and at their opposite or free ends secured together by ring 7'' about the open end of the turret.

This turret carries uniformly spaced and arranged letter grips, clamps or carriers arranged to be successively brought into operative relation with respect to the foremost letters in said way as the turret rotates. For instance, I show letter clamps or carriers arranged on the longitudinal bars or circumferential portion of the turret. Each bar can be provided with several parallel letter clamps spaced longitudinally thereof, each clamp being arranged transversely of the bar and at the outer side thereof. Each clamp in this particular example, consists of a fixed jaw 10, secured to a bar of the turret and projecting outwardly therefrom radially with respect to the turret, and a swingable jaw 11, at one end fulcrumed at 12, to the fixed jaw with its free end yieldingly held inwardly to the outer surface of the fixed jaw by any suitable means such as spring 13, usually concealed within the fixed jaw. The spring-held jaw can consist of sheet metal having side flanges 14, lapping the side faces of the fixed jaw and terminating short of the free end of the spring-held jaw to engage the longitudinal edges of the letters and limit the distance the letters enter between the jaws.

Each movable jaw or clamp is provided with means for swinging the same to open position for receiving and discharging letters. For this purpose, I show each clamp provided with elbow lever 15, arranged at the side of its fixed jaw and fulcrumed thereto at 16, and having its free end projected inwardly and approximately radially, and carrying roll 17, to engage fixed cam plate or track 18, arranged within the turret and suitably secured to the intermediate pedestal 9.

At a point intermediate its ends the elbow lever is formed with a point or projection 19, bearing against the edge of a flange 14, of the spring-held jaw.

When the roll on the free end of the elbow lever rides on the cam, the lever is swung outwardly and thereby swings the jaw (clamp) outwardly to open position against the tension of its spring and the clamp is thus held open until the roll leaves the cam, thereupon the spring snaps the clamp back to closed position. Each bar of the turret can be provided with one or more letter clamps, although in the particular example illustrated, I show three spaced clamps arranged in a row on each bar to virtually act as one in grasping the edge of a letter. I show the turret provided with five equally spaced longitudinal bars and consequently provided with five rows of clamps and these rows of clamps are successively brought to position on the rotation of the turret, and by the engagement of rolls 17, with cam plate 18, to successively receive letters from the front end of the letter way.

The turret is rotated in a direction to move rearwardly and upwardly from the bottom and forwardly and downwardly from the top and the letter clamps all face forwardly with respect to the direction of rotation of the turret, i. e., the front ends of the clamps are the free or letter grasping ends thereof. The turret is so arranged with respect to the feed way that the clamps move upwardly approximately through the front end of the feed way to receive the lower longitudinal edge of the foremost letter in said way and to push said letter upwardly from said way and carry the letter upwardly and forwardly at the top of the turret and down at the front thereof thereby reversing the letter so that its addressed face will be exposed right side up at the front of the turret. As the turret continues its movement, the letter will be carried downwardly and rearwardly below the turret, and the clamps will be then opened and the letter dropped into the distributing devices below the turret. The cam 18, is arranged to engage the elbow clamp-opening levers as the clamps pass down to letter discharging position and to hold said clamps open as they pass to the letter receiving position, and to release the levers when the clamps have received the letter and pass beyond the letter receiving position, so that the clamps will then snap to closed position gripping the letter firmly by its lower edge and holding the same in proper position.

The turret moves with a step by step motion. In the particular example illustrated, five strokes or steps are required to perform a complete revolution and carry a row of clamps from letter receiving position step by step around the circle and back again to letter receiving position. The turret is rotated through the medium of gear wheel 20, fixed on the rear end of its shaft beyond the rear pedestal 9, and meshing with a pinion 21, fixed on upright drive shaft 22.

The arrangement is such in this example, that a complete revolution of shaft 22, will propel the turret one step or a complete stroke to carry each set of clamps forward through an arc of approximately 72°.

Suitable means are provided to separate the foremost letter in the feed way from the remaining letters in said way and deliver the same to the open upwardly moving letter clamp with the ends in view of preventing the clamps grasping more than one letter at a time at the letter receiving position, and insuring the presence of a letter at the letter receiving position to be grasped by a clamp, at each stroke of the turret.

In the particular example illustrated, I provide a pneumatic suction device extending to a point in advance of the foremost letter in the feed way and arranged to move rearwardly into operative relation with respect to the lower portion of the front face of the foremost letter and then move forwardly carrying the lower portion of said letter forwardly and bending or separating the same from the letter behind and holding said lower edge in the path of the upwardly moving open letter clamp, and then release said letter from the suction approximately when the clamp closes on and grips the letter.

The particular pneumatic device shown for delivering the letters one at a time, to the clamps of the rotary turret, comprises a horizontal hollow rock shaft, pipe or casing 23, arranged transversely of the frame work immediately below the front open end of the feed way and carried by and mounted to rock in the upper ends of radial rock arms 24, extending upwardly from and carried by transverse shaft 25, supported in the frame work and constituting the axis on which said arms rock. The shaft 23, is provided with a suction nozzle 26, projecting upwardly therefrom and secured thereto and having its free or upper end hooked, curved, or otherwise deflected rearwardly so that the nozzle is approximately of a goose-neck formation, with its rear end terminating in an open rearwardly facing suction mouth. The hollow shaft can be provided with one or more nozzles 26, although in the present instance, I show the same provided with three similar nozzles 26 projecting in the same direction and spaced apart and arranged so as to move and lie in different vertical planes from those in which the clamps of the rotary turret revolve, whereby the suction nozzles can move forward between said clamps and the clamps can move upwardly between the nozzles. The interiors of these nozzles through their lower ends are in suction communication with the interior of the shaft 23 (when the mouths of the nozzles are in action) and the interior of said shaft is in operative suction connection with any suitable air exhausting device or pump (not shown) through air passage 27, arranged longitudinally of and in one of the arms 24, and air exhausting pipe 28, opening into said passage concentrically with the axis on which said arm rocks and leading to the air pump.

The nozzles are cut off from and are opened to operative connection with the air exhausting device, at certain points in their operative stroke to release and grip letters. For instance, I show a hollow or tubular slide valve or cut-off 29, longitudinally and snugly fitting and movable in the shaft 23, and at one end constantly open to suction communication with the interior of said shaft and having radial ports 30, adapted to register with the radial openings in the shaft to the lower or inner ends of the suction nozzles to place said nozzles in open communication with the air exhausting pump. The valve is longitudinally moved to bring the ports 30 to and from registration with the nozzles to open the nozzles to and cut the same off from the air exhausting device, by suitable means, such as central longitudinal valve rod 31, projecting to the exterior of one end of the shaft and at its exposed end provided with spaced annular stops between which the forked upper end 32, of a laterally movable lever arm 33 loosely fits to move the valve stem and valve longitudinally of the hollow shaft or valve casing 23.

When the suction device and feed way are at rest in normal position, the arms 24 and suction nozzles are at their limits of forward movement with the nozzles arranged between the clamps of the row in front of the feed way, and the valve 29 is in closed position so that no air is being drawn in at the suction mouths. When the parts mentioned are thus at rest in normal positions, and the turret is also at rest, said row of clamps will be in closed position grasping the lower edge of a letter delivered to them by the previous operation of the suction nozzles. If the shaft 22 should now begin to rotate to actuate the turret on a stroke or step, the row of clamps holding said letter will move upwardly, pushing said letter up from the open front end of the letter way and from the rearwardly facing mouths of the suction nozzles and longitudinally of and along the rear faces of letter guide and stop fingers 34, fixed to and projecting upwardly from the suction nozzles. The turret will come to rest at the completion of this stroke with said letter raised entirely clear of and above the letters in the letter way and in an upwardly and forwardly inclined position at the rear top portion of the turret and under a letter shield and guide 35, fixed to parts rigid with the frame work.

The curved letter stop and guide fingers 34, can be composed of flexible sheet metal at their lower ends fixed to the nozzles so as to form upward continuations of the rear portions.

While the said clamps are moving upwardly the feed way is in rearward position to relieve the letter being moved up by the clamps, from the forward pressure and friction of the pile of letters in the feedway which might otherwise interfere with the free withdrawal of the letter from the stack or tend to cause the letter immediately behind the one being withdrawn to move upwardly therewith.

The longitudinal movement of the letter way is timed and accomplished by a peculiarly shaped horizontally-disposed cam 36, fixed on the shaft 22, and arranged within and having edge driving engagement with an approximately encircling yoke 37, carried by a reciprocatory horizontally-disposed pitman 38, arranged longitudinally of the feedway and at its rear end coupled thereto at 39, to longitudinally move the feed way as the pitman is reciprocated by the cam.

After the said clamps have pushed the letter carried thereby up past the suction mouths of the nozzles, and before the turret completes said step or stroke, the arms 24, are swung rearwardly carrying the hollow shaft rearwardly with its nozzles, and thereby pressing the suction mouths of said nozzles rearwardly against the front face of the lower portion of the foremost letter in the feed way. While the nozzles are thus forced rearwardly against the foremost letter in the feed way, said way is being forced forwardly by the cam 36, to press the letters forwardly and insure the proper engagement of the foremost letter and suction mouths to bring said letter completely within the range of action of the reduced pressure within said nozzles. The frame work sides provide openings 40, in which the shaft or valve casing 23, is movable toward and from the turret; the limits of said movement being controlled by a cam 41, and link 57, hereinafter described.

This swinging movement of the valve casing 23, and its nozzle is effected and properly timed by the encircling or continuous cam groove 41, formed completely around the circumference of the cam or cylinder 42, arranged concentrically on and fixed to the shaft 22, said cam groove acting on the said valve casing through a suitable lever mechanism. For instance, I show a vertically rockable elbow lever 43, fulcrumed at 44, intermediate its ends to the frame work and at its front end carrying lateral stud or roller 45 fitting in the cam groove 41, and at its opposite end having upright toothed sector 46 meshing with toothed sector 47 rigid with and depending from one of the arms 24, carrying valve casing 23. When the roller 45, is depressed by the cam groove 41 of the rotating cam cylinder 42, the lever 43, is rocked to swing the valve casing 23, and its nozzles rearwardly against the letters in the feedway, and when the roller 45, is elevated by the cam groove the valve casing and its nozzles are carried forwardly toward the turret. When the roller 45 occupies horizontal portions of said cam groove the valve casing and nozzles are held against fore and aft movement.

One revolution of the cam 42, causes one complete stroke of the nozzles rearwardly from normal position to secure a letter and then forwardly back to normal position to deliver said letter to the turret, and the cam groove 41, is so arranged that the movements of the nozzles will be properly timed with respect to the movement and position of the turret letter clamps during each stroke thereof.

The mechanism for moving the valve 29, to open and close the nozzles to and from the air exhausting means, is actuated and timed by an annular or encircling cam groove 48, in the upper end of the cam cylinder 42, so that said nozzles are shut off from the air exhausting means while at rest in their normal advanced positions, and will be automatically cut off when they have reached that point in their forward movement where the letter carried thereby has entered or approximately entered the open clamps of the turret at the letter receiving position, and so that the nozzles will be opened to the air exhausting means on their rearward stroke to take hold of the letter and will remain open on their forward strokes carrying the letter to position where the letter is released and delivered to the clamps.

Any suitable mechanism can be provided for moving said valve although in this example, I show the arm 33, forming part of an upwardly projecting crank arm from a rock shaft 49, arranged at right angles to the length of said valve and suitably mounted in journal boxes carried by a side of the frame work and formed with an inwardly extending lateral arm 52, at its inner end geared at 53, to the laterally extending arm of a bell crank 54, mounted to rock on a horizontal fulcrum 55, and provided with roller 56, at the end of its depending arm and confined between the vertical walls of the cam groove 48.

The cam groove 48 is formed with portions concentric with the shaft 22, to hold the valve for the desired length of time in open position and with one or more offset portions to move the valve to closed position. It is obvious that the inward or outward deflection of the vertical walls of said groove will move the roller 56, laterally and thereby swing the lever 54, to rock shaft 49, through the medium of gearing 53, and arm 52, in a direction to swing the crank arm 50, 33, toward or from the valve to move the same longitudinally. The crank arm 50, 33, comprises the section 50, rigid with shaft 49, and the upper section 33, pivotally joined to section 50, by hinge or pivot 51, to permit upper section 33 to swing fore and aft with the shaft or valve casing 23, on the axis 25. The pivot 51 is approximately alined with said axis 25.

The cam or cylindrical block 42, having cam grooves 41, and 48, and the cam 36, are actuated by the one shaft 22, which also has direct driving connection with the turret, and these various parts are arranged to time and operate the suction nozzles, the valve, the feed way and the turret in certain fixed relations and sequence so that said parts will co-operate to attain certain results.

In this connection, however, attention is called to the fact that I do not wish to limit myself to the particular operating mechanisms disclosed, not in fact to the particular valve mechanism described, nor to the use of the particular pneumatic means in connection with any particular turret or other letter carrying or feeding device, nor do I wish to limit the turret to use in connection with any particular construction of letter separating device or other means for delivering letters thereto.

I preferably, provide the shaft or valve casing 23, with means to rock the same in the journal boxes provided therefor in the radial or rock arms 24, as said arms swing fore and aft so as to cause the suction nozzles to swing vertically on the axis of casing 23, as a center.

Figures 1, 12, 13, 14:
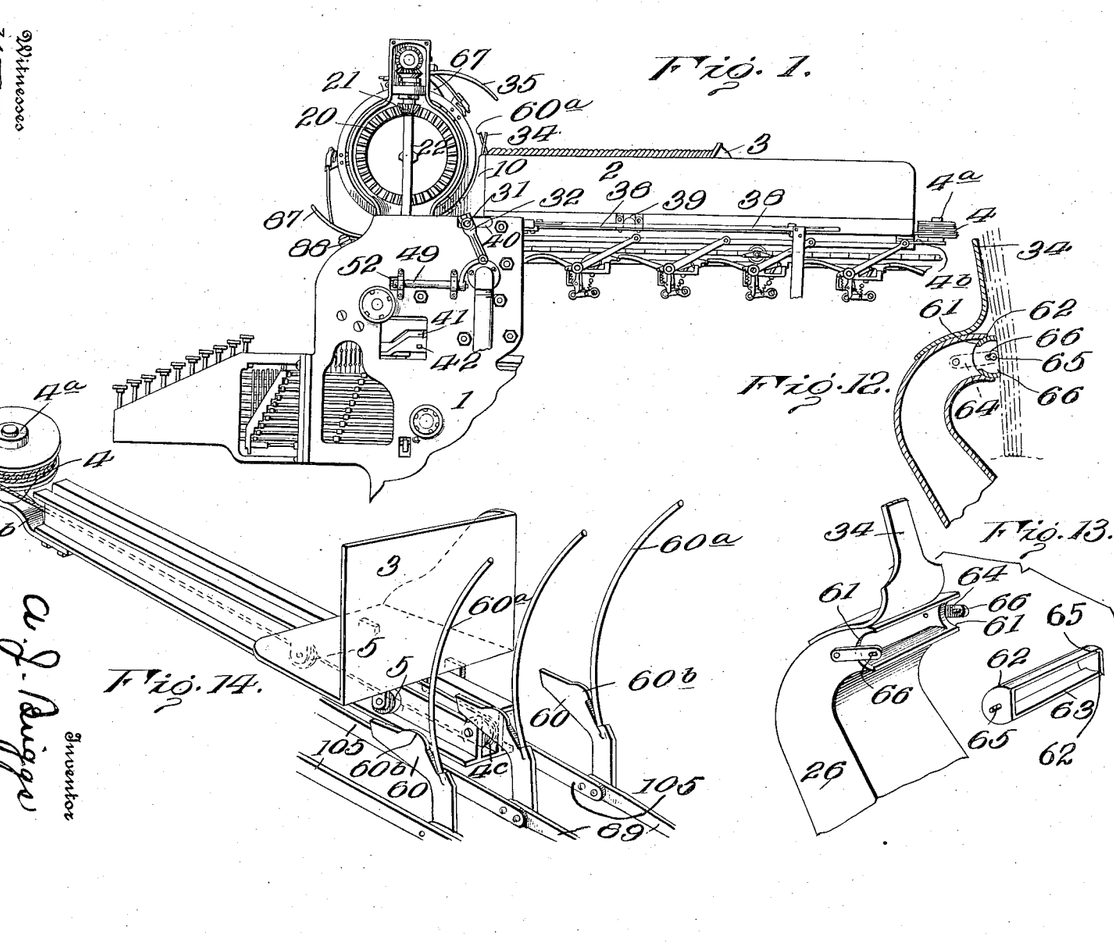
Fig. 1, is a side elevation showing my invention applied to a distributing apparatus, a portion of which is shown.
Figs. 12 and 13, are views of details of the suction mouths.
Fig. 14, is a perspective of details of the letter hopper or feedway and of the breast or mail unit stop wall at the front thereof.
Figure 2:
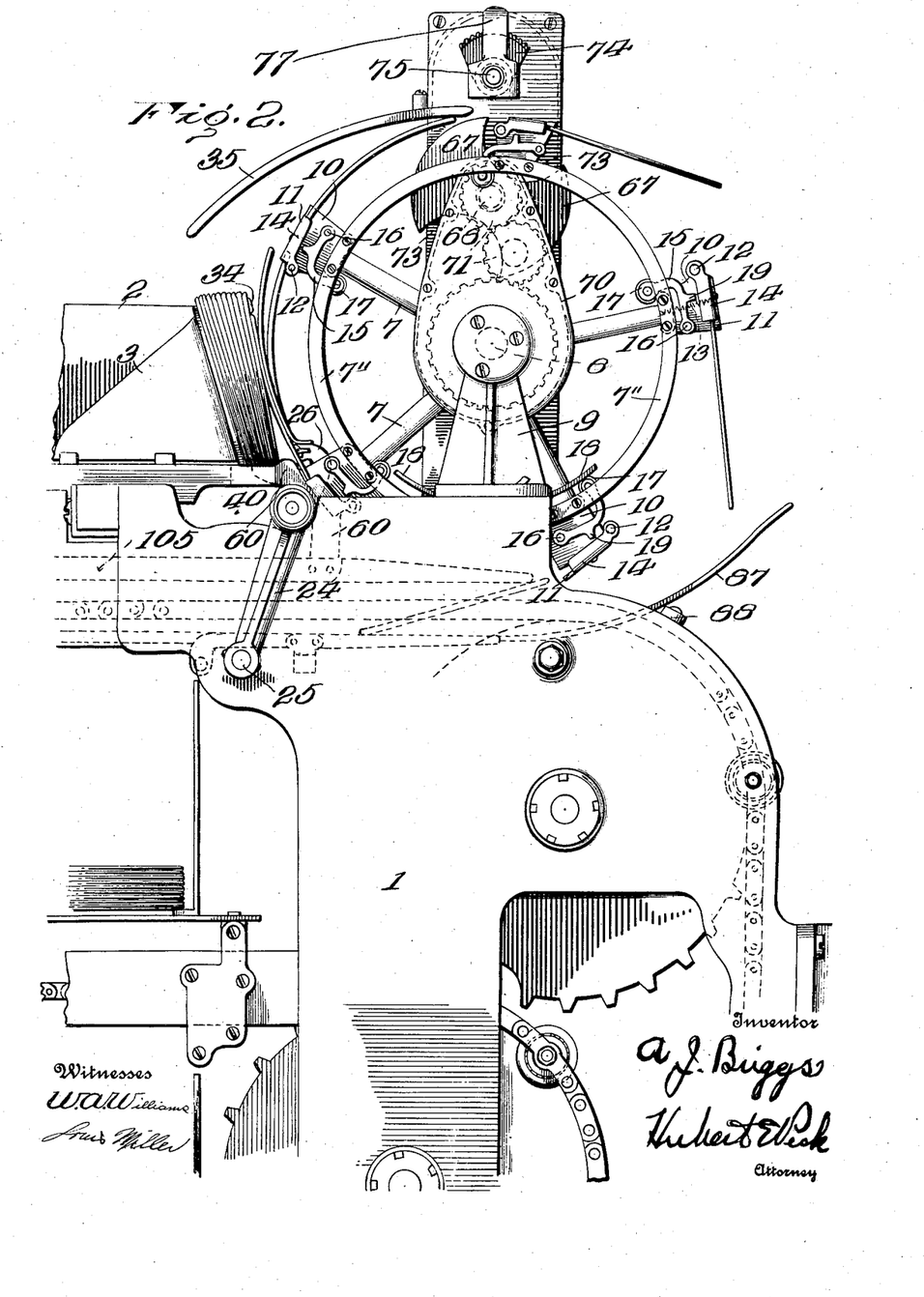
Fig. 2, is an elevation of the opposite side of the apparatus involving my invention.
Figure 5:
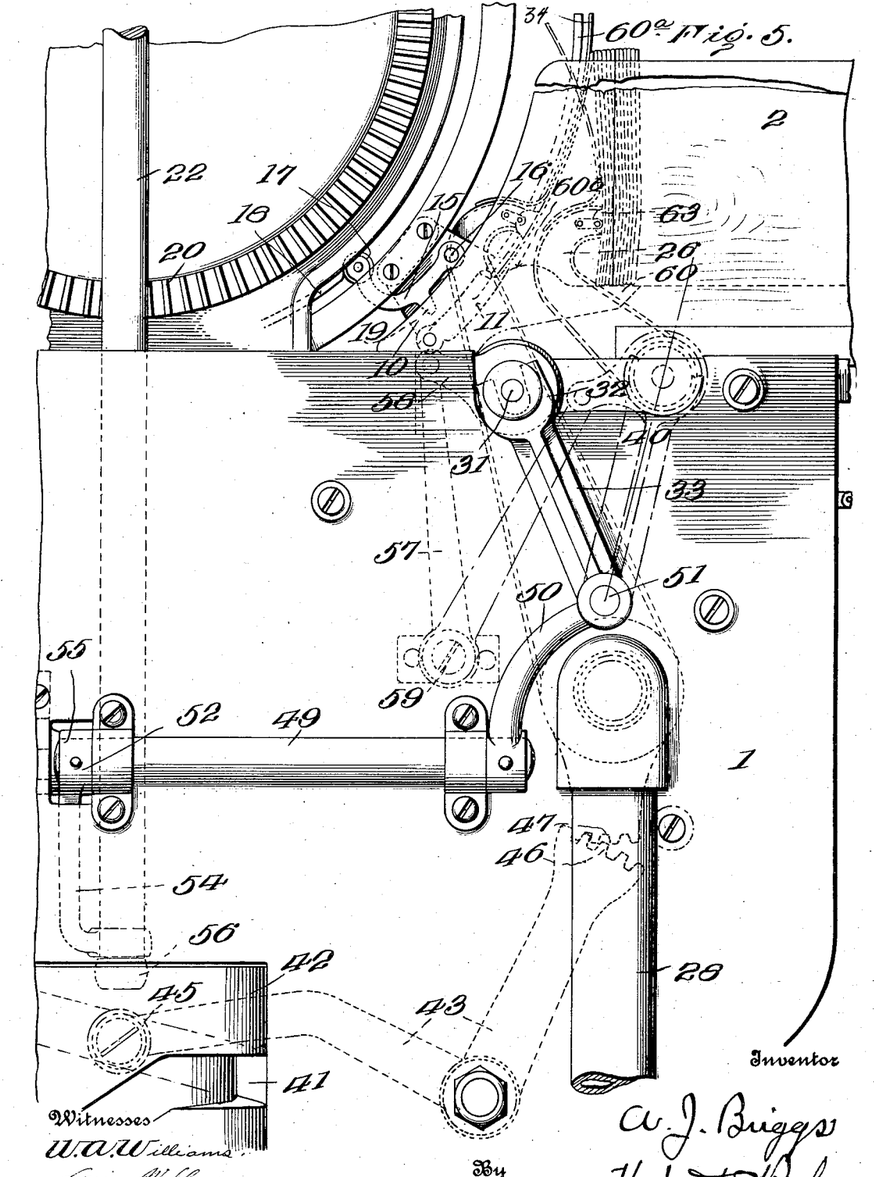
Fig. 5, is a side elevation of a portion of the mechanism, on an enlarged scale, and taken from the side opposite that shown in Fig. 2, various parts being shown in certain positions by dotted lines.
Figures 6, 7, 8:
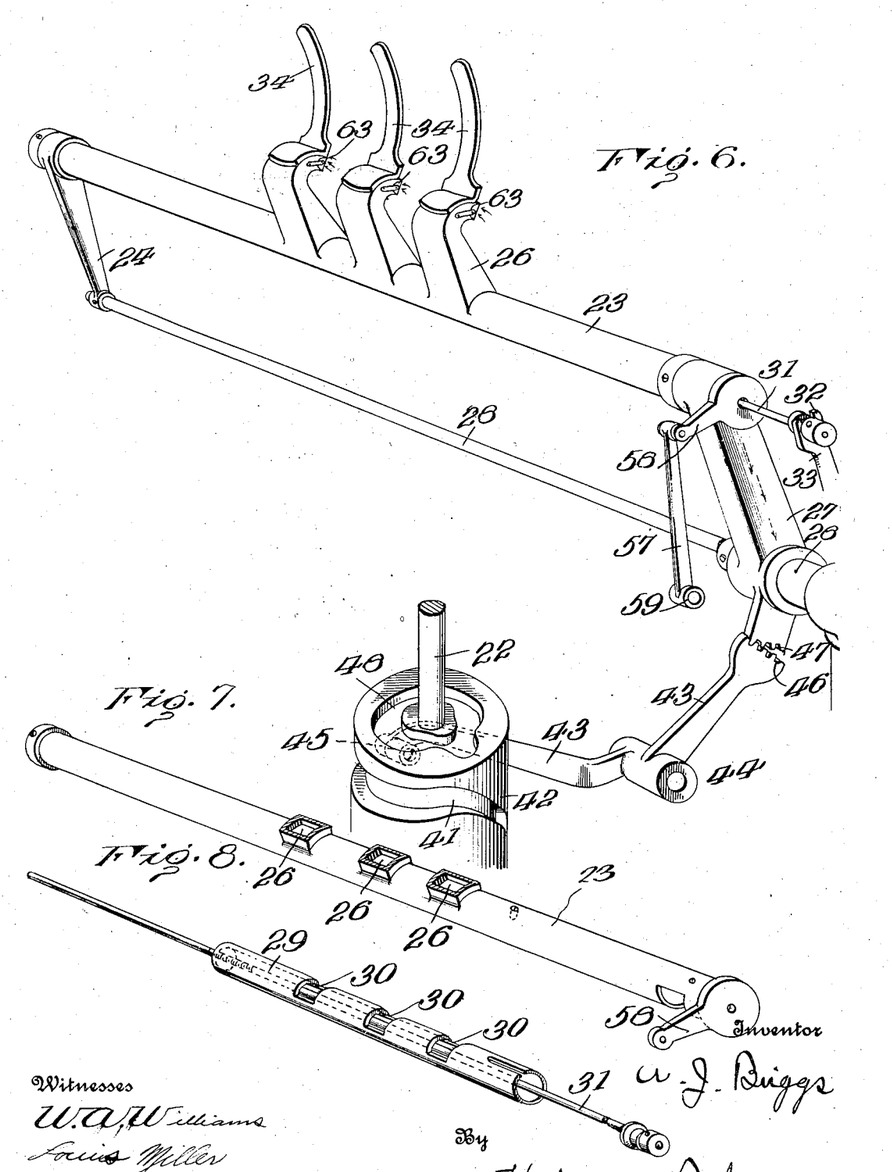
Figs. 6, 7, and 8, are detached perspective views of parts of some details of the mail unit separating and feeding devices.
Figures 9, 10, 11:
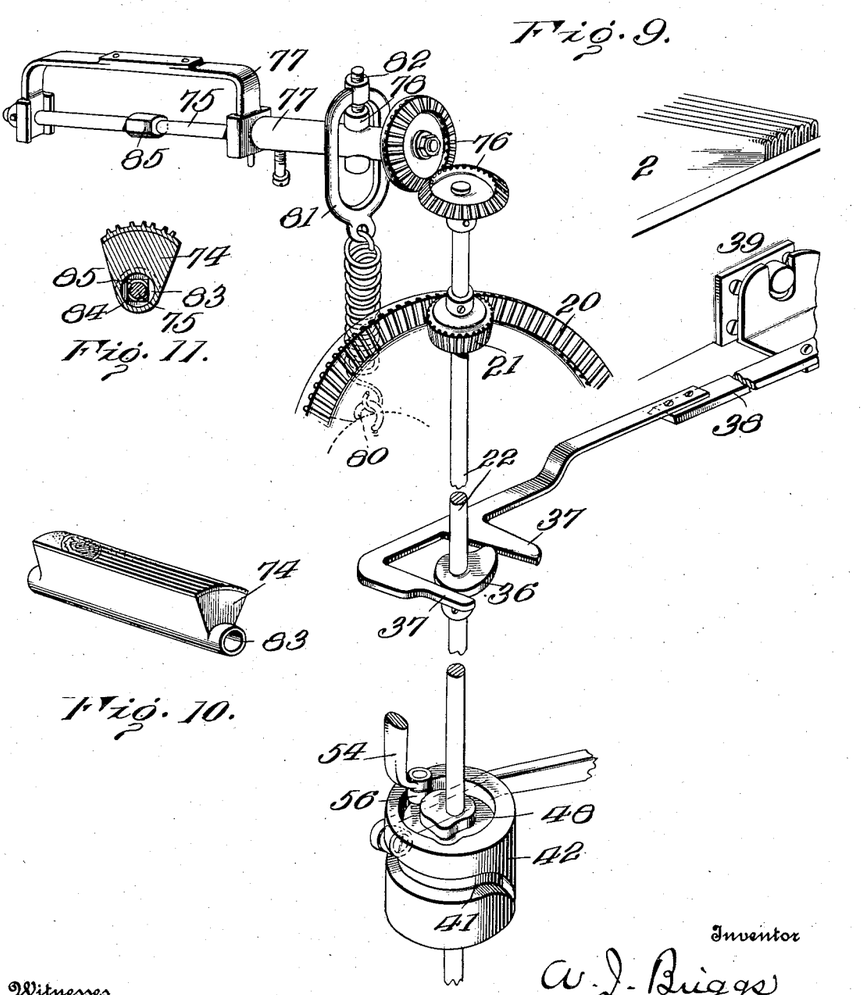
Fig. 9, is a perspective of certain details of the operating and controlling devices and of the printing mechanism.
Fig. 10, is a detail perspective of the rotary printing head.
Fig. 11, is a cross section through said printing head and its shaft.

In the particular example illustrated, the rocking action of the valve casing 23, and nozzles is caused by an upright link 57, at its upper end pivotally joined to the free end of a short forwardly projecting arm 58, rigid with the valve casing, and at its lower end pivotally joined to a side of the framework to rock about fixed pivotal point 59. The pivotal point 59 is arranged a distance in advance of the axis 25, from which the valve casing swings, and it is obvious that as the valve casing moves rearwardly on its letter securing stroke, said link will cause the arm 58 to swing down and the nozzles to swing forwardly while the nozzles will gradually straighten up as they move forwardly on their letter feeding or separating stroke, see Figs. 2, 5 and 6.

The letters pass forward from the front end of the floor of the feed way or hopper onto the upper longitudinal edges of several spaced parallel stationary floor strips or edge-wise arranged plates 60. These strips 60, are arranged in forward longitudinal continuation of the floor of the feed way and their rear ends break joints with the front end of the floor of said way (as by projecting rearwardly into longitudinal slots therein) so that the feed way can freely reciprocate and yet the lower edges of the letters can easily slide forward from the floor of the way onto the longitudinal top edges of said strips.

The strips are fixedly supported in any suitable manner. For instance, I show the strips at their lower ends fixed to a stationary portion of the apparatus, such as bars 105, and extending vertically therefrom with their rear ends extending rearwardly. Intermediate the lengths of their top letter-receiving edges, said plates or strips 60, are formed with the curved or rounded upward letter-stop-or-separating bulges $60^b$, while at their front portions adjacent to, or between the paths of the turret clamps, said plates or strips have the lower ends of curved upwardly projecting letter guiding and stop fingers $60^a$, fixed thereto and supported thereby.

The arrangement of the suction-nozzle-rocking link 57, with respect to certain other parts, is such that on the forward movement of the valve casing 23, said nozzles will be rocked or swung vertically in a manner to move the letter being carried forward thereby over and approximately clear of the stop or separating bulges $60^b$, until said letter reaches its limit of forward movement against the stop and guide fingers or wires $60^a$, and in position to be grasped by the turret clamps moving upwardly between wires $60^a$, which in connection with the suction mouth fingers 34, virtually form the front "fence" or wall of the feed way or hopper as well as a guide for the letters while being carried up from the letter way by the turret.

The suction nozzles virtually swing upwardly in carrying the foremost letter forward and bend or lift the lower portion of the letter over the bulges $60^b$, and hence separate the same from the remaining letters of the common pile which are held back by engagement with said bulges. The letters behind said foremost letter are being constantly urged forward by the spring actuated follower, but said bulges hold the same back from the foremost letter and afford space for the free movement thereof while being pushed up by the turret clamps. The separating action is aided by the fingers 34, of the nozzles which press back the upper portions of the letters.

The initial separation of the foremost letter from those behind it is materially aided by the peculiar action of the nozzle in bending the lower edge of the letter forward or in causing the letter to assume a tilted position.

I preferably provide each nozzle with an automatically rockable letter engaging section or mouth freely movable vertically to conform to the surface or face of the letter held thereto and thereby insure the grip of the mouth on the letter against accidental detachment of the letter by reason of inequalities in the face or surface thereof. For instance, I show the vertical side edges of the free or suction ends of the nozzles concaved or formed with approximately semi circular notches 61, to receive the corresponding convexed or semi circular ends 62, or supplemental or oblong open mouths or letter engaging sections 63, having straight flat letter engaging rear edges. These mouths are loosely confined in or to the nozzle ends by side plates 64, fixed to the nozzle side walls and projecting forwardly beside the ends 62, which have pins 65, confined in slots or perforations 66, in said plates. This supplemental mouth is free to rock vertically in the socket formed in the nozzle end (by the rounded depressions and by beveling the inner faces of the top and bottom edges of the nozzle end) in adapting itself to the face of the letter held thereto so as to maintain itself parallel with the face of the letter to insure the tight adherence of the letter to the nozzle and to prevent such leakage of air into the nozzle as to permit accidental detachment of the letter from the nozzle.

I provide suitable mechanism for imprinting each letter while being carried by the turret from the feedway to the distributing devices. This printing device is usually utilized for the purpose of canceling the stamps on the letters and applying the postmarks thereto, although of course, the printing device can be utilized for otherwise imprinting the letters or other articles being carried forward by the turret.

In this particular example, I show the printing device arranged to receive and act on each letter as it passes over the top of the turret from the letter station at the upper rear part of the turret to the letter station at the upper front part of the turret.

The printing mechanism consists of a rotary printing couple, the printing element or die thereof being arranged above the turret, and the impression element thereof being arranged below the die and within the turret, although mounted separately. The impression element consists of a relatively-short rotary impression roll 67, arranged immediately above and parallel with the axis about which the turret rotates. This impression roll or surface is carried by a shaft 68, projecting beyond the ends of the roll and at one end mounted in and supported by pillar 69, and at its opposite end mounted in a gear box housing 70, enclosing the gearing 71 whereby said shaft 68, is geared to and rotated by the turret shaft.

Figure 4:
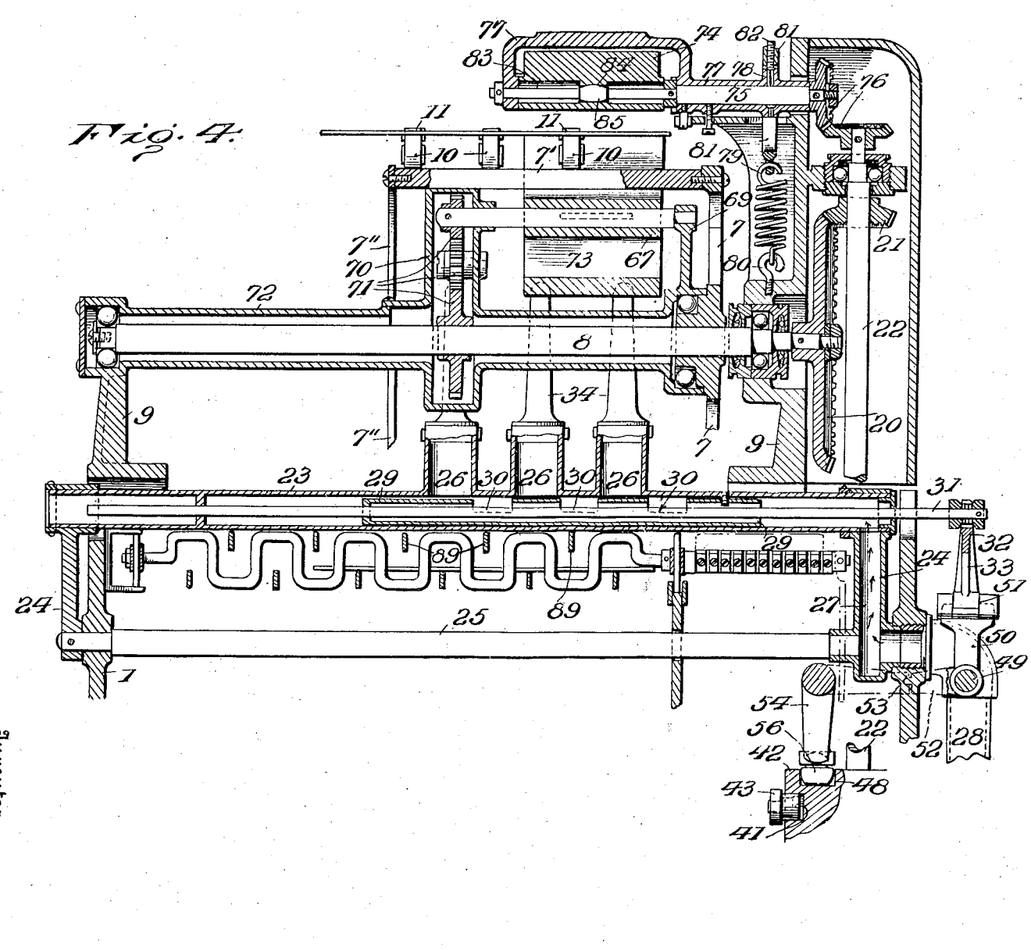
Fig. 4, is a vertical section.

In the particular example illustrated, this gearing requires rotation of the impression roll in the same direction as the turret and at the same peripheral speed. The gear box 70, and the pillar 69, are arranged vertically within the turret, and said box and pillar are rigid with and carried by a fixed horizontally-elongated housing or sleeve 72, at one end fixed to and supported by the front side pedestal 9, (at the left Fig. 4) and longitudinally receiving the shaft 8, carrying and driving the turret. This fixed sleeve or housing 72, encloses the shaft 8, approximately throughout its length with its rear end terminating a sufficient distance from the right hand pedestal 9, (Fig. 4) to allow space between the end of the housing and said pedestal for the end head or spider 7 of the turret. This impression roll is divided into two diametrically-opposite similar impression surfaces of the same radius and concentric with the axis of rotation, by two diametrically-opposite similar concavities or concaved depressions 73, and the impression roll is so timed with respect to the turret that when rotating the rows of letter clamps of the turret will register with and enter said depressions and hence not interfere with the impression roll, and the letters carried by said clamps will overlie the impression surfaces in position to be imprinted, as clearly indicated by Fig. 2.

Figure 3:
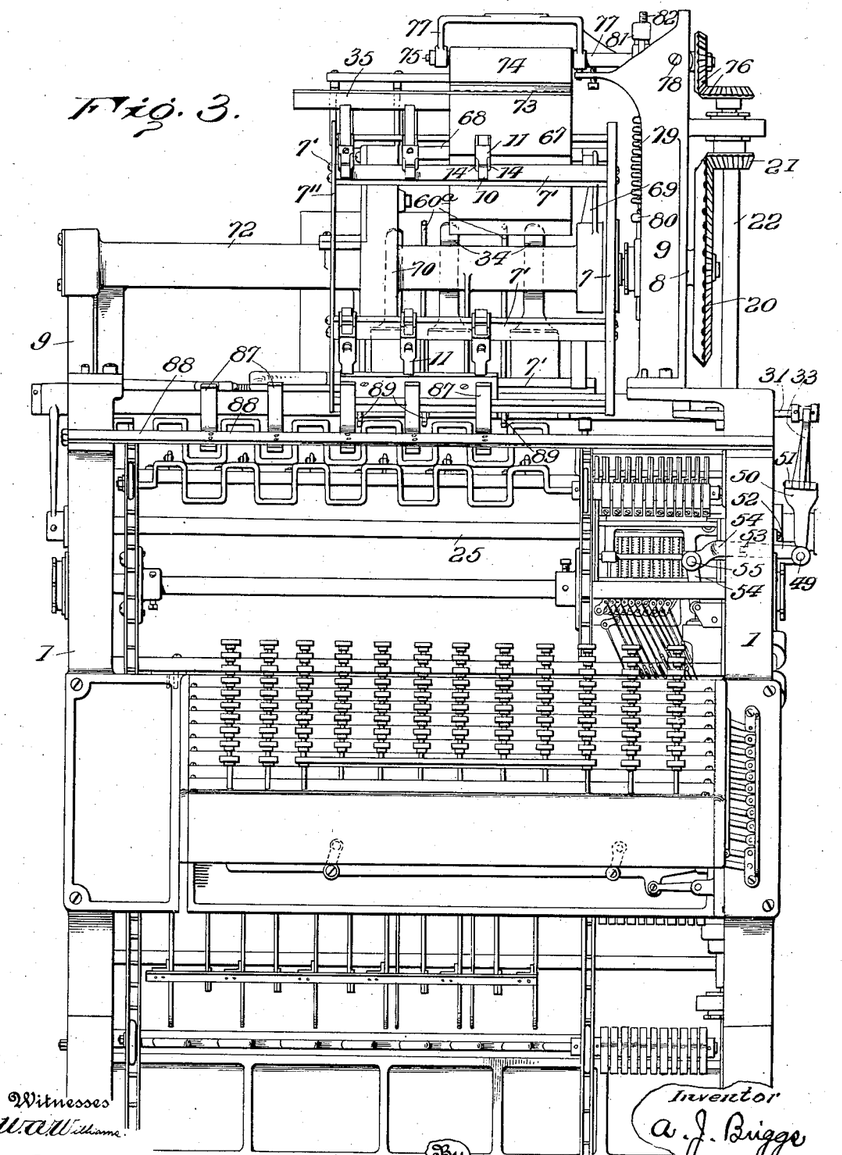
Fig. 3, is a front view of apparatus involving this invention.

The rotary-sector shaped printing member or die 74, is arranged above and parallel with the impression roll and turret and is carried by horizontal shaft 75, driven by shaft 22, through the medium of bevel gearing 76, designed, in this example to cause rotation of the die so that its printing face will register with the impression surfaces of the impression roll, successively, on each rotation of said roll, and with approximately the same surface speed as said surfaces and the advancing letter. The die is timed to register with the rear portions of each impression surface. The shaft 75 is mounted in and carried by a vertically swingable hanger or bracket 77, mounted in the upper end of rear side pillar or pedestal 9 to swing on the transverse or horizontal axis 78, see Fig. 3. The bracket is yieldingly held to its limit of downward movement by a suitable spring device, such as coil spring 79, at its lower end suitably secured at 80, and at its upper end confined to the lower end of a yoke 81, encircling the bracket 77, and vertically adjustable with respect thereto to adjust the tension of the spring thereon by set screw 82.

The shaft 75 is longitudinally removable from its hanger 77, and the die is formed with a hub having an enlarged longitudinal bore 83, extending completely therethrough and at the center of its length having contracted portion 84, approximately square in cross section and flaring or enlarging in opposite directions from its center toward its opposite ends to receive an enlargement 85, rigid on the shaft 75, and approximately square in cross section and longitudinally reducing from its central portion in opposite directions toward its ends. The bore of the die is of sufficient size to permit the shaft enlargement to slip freely and longitudinally thereinto and to enter the bore contraction 84, and the abutting approximately flat faces of the enlargement 85, and contraction 84, will constitute the coupling whereby the shaft rotates the die but the formation of the shaft and die bore will permit the die to rock on the shaft in adjusting or adapting itself to uneven letters in imprinting the same.

As the turret is making a stroke, the front long edge of a letter advancing from the rear top portion of the turret will pass over the front edge of a forwardly moving impression surface of the impression roll and will be guided down thereto by the front edge of letter guide 35, and by the time the rear portion of said letter has moved to a point beneath the die, said die in its rotation will have reached printing position and will co-operate with said impression surface in imprinting the stamp canceling and postmarking imprints on the desired portions of the letters. The die and impression surface rotate or move along with the advancing letter and by the time the clamps carrying said letter reach the impression surface, the die will have moved up from the letter and the impression surface will have passed on down and a recess 73, will receive said clamps and accommodate them (see Fig. 2) so that when the parts have completed said stroke, they will come to rest with the clamps in the recess and the letter will be located above the front top portion of the turret and the other impression surface of the impression roll will be in position to receive the next letter carried by the following row of clamps of the turret. The shaft carrying the die is yieldingly held down toward the impression roll to accommodate both thick and thin letters and apply the desired printing pressure thereto, while the swingable mounting of the die on the shaft permits the same to rock from the center of its length as a fulcrum to conform to letters of varying thickness in different portions.

Any suitable inkling roll (not shown) can be carried by hanger 77, to ink the die previous to its arrival in printing position.

I show the hanger 77. formed with a vertical offset to support the outer end of the shaft 75, and provide space to receive and allow for the rotation of the die.

If it should be necessary to "back stamp" canceled and post-marked incoming mail, being distributed for the carriers or other purposes, an impression surface of approximately the form of die 74, might be substituted therefor, and a printing wheel of approximately the form of the impression roll 67, might be substituted therefor and provided with printing characters at the rear portions of its two concentric surfaces. Where the elements of the printing couple are thus reversed, a suitable inking roll would be arranged within the turret to cooperate with the printing characters of the rotary element 67.

It will be noted, that the separating mechanism, the turret, and the printing couple are formed and arranged to properly operate on letters of marked differences in width, inasmuch as the seperating mechanism takes hold of the lower long edge portions of the letters whereon the stamps should be located, irrespective of the width of the letter, and the same remark is true of the turret clamps. Also, the printing member is timed and arranged to imprint on said long edge portion of each letter grasped by said clamps irrespective of the width of the letter or the distance the letter projects forwardly beyond said clamps. The capacity of the turret as to extreme width of letters, is limited by the distance between adjacent rows of letter clamps, while the turret is approximately unlimited as to extreme length of letters.

The letter feeding portion of the machine is limited as to length of letters by the distance between the turret head 7, and the opposite side portions of the framework.

The stamped ends of the letters are lined or evened up in the feed way against the rear side wall thereof while the long lower edges of the letters are also lined or evened up against the floor of said way, and the pneumatic separating device, the turret clamps, and the printing couple are accordingly arranged to handle and operate on the letters in view of this known fixed arrangement or location of these edge portions of the letters.

At each stroke of the turret a letter is moved downwardly and rearwardly from the vertical front position where it is held for inspection, and is dropped (by the cam surface or plate 18, opening the letter clamps) from the bottom or under side of the turret onto a horizontal floor comprising longitudinal spaced rails or fingers suitably fixed to one or more supporting cross bars secured to the frame work sides. The letter is deposited in a horizontal position on said floor with its long edges arranged transversely thereof.

Spaced upwardly and forwardly extending fingers 87, carried by cross bar 88, are provided to direct the lower free edge of the letter rearwardly toward said horizontal floor as the letter is carried down by the turret. The letter is delivered under fingers 89, and onto said floor, when the lower turret clamps are opened by cam plate 18. These fixed suitably-supported forwardly-projecting guide fingers 89, are spaced apart, and located between said floor and the bottom portion of the turret, and are preferably so arranged that the letter clamps of the turret will pass rearwardly, between said fingers.

Any suitable means can be provided for actuating the shaft 22, either continuously or a complete revolution at a time so that the shaft when thrown into gear with its driving means will make a complete revolution and then come to rest. This case is filed as a division of my application filed May 23, 1913, Serial No. 769,438 for mail distributing apparatus and if so desired the mechanism disclosed in said application for actuating and controlling shaft 22, can be employed in connection with the mechanism disclosed and claimed in the present case. However, my invention is not limited to actuating the shaft 22 step by step, inasmuch as the turret can rotate continuously as the suction fingers are timed to operate in proper sequence with respect to the clamps or holders of the turret and the printing mechanism operates on the letters as they are passed therethrough by the turret whether or not the turret movement is continuous or step by step. Where the turret moves continuously the letters will be successively dropped therefrom at the turret discharge station whether said letters are to be distributed to distributing apparatus or other means.

I do not wish to limit my invention to a turret involving any particular number of letter holders.

I herein employ the term "letters" in a broad or generic sense to include any and all kinds of mail matter and other articles or pieces which the apparatus is adapted to handle, or for the handling of which it can be adapted or utilized.

For the sake of clearness I have with great particularity described the details of the various groups of mechanisms employed in the example of my invention that I have selected for illustration, but I do not thereby intend or wish to so limit my invention. While I wish to lay claim to all novel details of the various groups of mechanisms, yet I particularly lay claim to all the broad novel arrangements, features and combinations of my invention not limited to any particular construction.

It is evident that various modifications, variations, and departures might be resorted to, that elements and groups of elements might be omitted and that features might be added, without departing from the spirit and scope of my invention, and hence I do not wish to limit myself to the exact disclosure hereof, but consider myself entitled to all equivalents, adaptations, modifications, variations, and departures falling within the spirit and scope of the invention as defined by the following claims.

Desiring to protect my invention in the broadest manner legally possible, what I claim is:

1. In distributing apparatus, in combination, normally inactive letter moving mechanism having a step by step movement and provided with series of letter grasping means, each series adapted to move a letter upwardly from a common source and reverse and expose the addressed face of the letter for inspection and finally deposit the letter at a receiving station, and means for successively opening said series of letter grasping means to receive and to deposit letters.

2. In combination, a receiving way, a turret rotatable about a horizontal axis with a step by step motion and arranged in front of said way and provided with uniformly spaced letter holding means, normally inactive letter separating means adapted at each stroke to separate the foremost letter in said way from the remaining letters therein and deliver the same to letter holding means of said turret, and means to positively operate said holding means to permit letters to drop by gravity therefrom at a receiving station.

3. In combination, a letter way, a turret arranged in front of said way and rotatable about a horizontal axis and provided with letter holders uniformly spaced about its circumferential portion, means to rotate said turret with a step by step movement and with said holders successively moving upwardly in front of said way to successively receive the foremost letters in said way and push the same upwardly therefrom, and means to positively open said holders to successively drop the letters carried thereby at a receiving station.

4. In combination, a letter way, and a letter separating device adapted to take hold of the foremost letter in said way and bend and separate the same from the remaining letters in said way and comprising a movable suction nozzle extending upwardly in front of the foremost letter in said way and movable toward and from the same and provided with an upwardly extending finger, for the purposes substantially as described.

5. A vertically rotating turret, means for moving the same with a step by step motion, said turret provided with letter holding clamps uniformly arranged around the circumference thereof, and moved by said turret to letter receiving position, letter displaying position and letter dropping position, means to open said clamps successively at the letter receiving position and also to open said clamps successively at the letter dropping position, in combination with actuating and controlling devices.

6. In combination, means to maintain the common pile of letters to be distributed, a separating device arranged in front of the pile and movable toward and from the same, mechanism to receive the letters from said device and to move the same laterally from the pile, actuating connections to force the pile of letters toward said device when advancing to secure a letter and to reduce the forward pressure on said pile when said mechanism is moving a letter therefrom, and operating and timing gearing.

7. In combination, means to maintain a pile of letters, a support for said letters having a separating and stop bulge, suction means to grasp the foremost letter of said pile and move the same forwardly over said bulge, and letter conveying means to receive the letter from and move the same upwardly past said suction means.

8. In combination, a letter supporting floor, means to press forward a pile of letters on said floor, spaced strips arranged in front of said floor and on which the lower edges of said letters are adapted to move forward, said strips having upward letter-separating and stop bulges, means to successively move the foremost letter of said pile forwardly and over said bulges to separate the same from the remaining letters of said pile, and letter conveying devices to successively move said foremost letters from their positions in front of said bulges.

9. In combination, a rotary turret provided with means to grasp and hold a letter or the like by one edge only at the exterior of the turret and with its addressed face exposed, means to rotate the turret from letter receiving position upwardly and forwardly to letter printing position and downwardly and forwardly from letter printing position to letter display position and downwardly therefrom to letter dropping position, means to cause said letter grasping means to take hold of the letter at receiving position and to drop the letter at letter dropping position, and mechanism to present letters successively in a vertical position at said letter receiving position with their edges in position to be grasped by said letter grasping means and with their addressed faces toward the rear so as to be exposed at the front for reading by the operator when presented at display position by the turret.

10. In combination, a letter way provided with spaced fingers forming the front end wall thereof and having mechanism for maintaining letters or the like arranged on edge face to face together in a pile, said way also provided with means to hold back the lower longitudinal portions of the letters in rear of said fingers, a periodically movable feeder to successively move the foremost letters in said way forwardly past said means and their lower portions into engagement with said fingers, and a rotary turret having means for successively removing said foremost letters in engagement with said fingers and for displaying the addressed faces of the letters at an inspection station and for depositing the letters at a discharge station.

11. In combination, a horizontally disposed letter way having means to hold a number of letters together in a pile with their lower longitudinal edges movable forwardly on the floor of the way, vertically arranged spaced fingers forming the front end wall of the way, means normally maintaining the lower portion of the foremost letter in said way spaced rearwardly from the lower portions of said fingers, a periodically movable feeder for successively moving the lower portions of said foremost letters forwardly to said fingers, and a rotary letter conveying displaying and depositing turret having means for receiving said foremost letters from said feeder and for removing the same from said way longitudinally of and behind said fingers.

12. In combination, means to feed forward and maintain a number of letters arranged vertically face to face loosely together in a pile, an obstruction normally engaging and holding back the lower portion of the foremost letter of said pile, a feeder for periodically pressing back said pile of letters and successively moving the foremost letter forwardly past said obstruction, and a rotary letter removing displaying and depositing turret having means to successively remove said advanced foremost letters and convey the same to a display position and then deposit the same at a discharge station.

13. In combination, a letter way at its front end having spaced forwardly projecting upwardly bulged floor projections provided with upwardly extending spaced letter guide and stop fingers, a feeder movable between said projections and fingers to periodically move the foremost letters in said way past said bulges and forwardly against said fingers, and means for removing said advanced foremost letters upwardly along said fingers from the way.

14. In combination, a letterway, a feeder for successively moving the foremost letter in said way forwardly to discharge position, said feeder having a rearward letter grasping movement in said way and a forward letter feeding movement, means for exerting forward pressure on the letters in said way during the rearward movement of said feeder and for relaxing said forward pressure on the letters during said forward movement of the feeder.

15. In combination, a letter way having spaced downwardly and forwardly curving letter stop and guiding fingers at its front end, a letter feeder moving between said fingers and forwardly and rearwardly in said way, said feeder also having an additional vertical movement on a comparatively short radius to bend the foremost letter in said way to approximately conform to the curvature of said fingers, and means to remove the letters along said fingers.

16. In combination, a letter way and a feeder movable longitudinally in said way to press back the letters therein and to move the foremost letter forwardly in said way, said feeder having an upward and downward movement on its forward stroke to bend and elevate and depress an edge portion of the foremost letter in said way while moving said letter forward.

17. In combination, a letter way, a letter separating obstruction on the floor of the front end thereof, a vertically disposed letter stop and guide in front of said obstruction, a feeder having a longitudinal movement in said way to move the foremost letter therein forwardly to said stop and guide, said feeder also having a vertical movement to carry the letter past said obstruction, and letter moving means for successively removing the advanced letters upwardly along said guide and stop and from said way.

18. In combination, a letter way, spaced letter guide and stop fingers vertically arranged in front thereof, means to separate the foremost letter from the remaining letters in the way and hold the same against said fingers, and a rotary letter conveying displaying and depositing turret in front of said way and having letter grasping means movable between said fingers to remove the foremost letters upwardly from said way.

19. In combination, a rotary letter conveying displaying and depositing turrent having means uniformly spaced around the same for holding letters exposed at the exterior thereof, a vertically disposed letter stop and guide to the rear of said turret and at the turret letter receiving position, said means constructed and arranged to successively take hold of letters behind said stop and guide and remove the same vertically therefrom, and a feeder and separating mechanism for successively removing the foremost letters from a pile and deliver the same at the rear of said stop and guide.

20. In combination, a feed way, and means for successively advancing the foremost letter in said way comprising a shaft arranged transversely thereof, means for bodily moving said shaft forwardly and rearwardly with respect to said way in a fixed arcuate path, letter feeding suction nozzles carried by and swingable on said shaft to move the foremost letter forwardly in said way, and means causing said nozzles to rock on said shaft as an axis to impart a vertical movement to the letter as said shaft moves in its said path.

21. In combination, a letter way, and means for successively advancing the foremost letters in said way comprising a letter feeding suction nozzle movable in said way, an axis arranged transversely of said way and carrying and on which said nozzle is swingable, means for bodily moving said axis in an arcuate path extending approximately longitudinally of said way to move the foremost letter forwardly in said way, and means for vertically swinging said nozzle on said axis as said axis moves in its path.

22. In combination, a letter feeding and separating device comprising a letter way having an obstruction opposing the advance of the letters, a horizontal axis arranged transversely with respect to the direction of forward movement of the letters in said way, means for bodily moving said axis forwardly and rearwardly, an upright letter moving suction nozzle of approximately goose neck formation and vertically swingable on and carried by said axis, and means for causing said nozzle to swing on said axis as the axis moves in said path.

23. In combination, a letter way, and means for successively advancing the foremost letter in said way and separating the same from the remaining letters comprising means to normally hold back corresponding edge portions of the letters and a rockable letter feeding suction nozzle constructed and arranged to successively advance the foremost letters and to bend and move the same to clear said means, said nozzle provided with means to press rearwardly against each foremost letter when the nozzle rocks while said letter is being bent and moved forwardly by said nozzle.

24. In combination, a letter way, spaced letter guide and stop fingers at the front thereof, and means for successively advancing the foremost letters in said way and holding the same to said fingers for delivery, said means comprising a letter feeding suction nozzle movable in an arcuate path between said fingers and constructed and arranged to successively bend and advance the foremost letters and provided with means to press rearwardly against one portion of said letter as another portion thereof is being bent and moved forwardly by the nozzle.

25. In combination, a letter way, and letter feeding means comprising an axis arranged transversely with respect to said way, means for bodily moving said axis back and forth in a path of movement approximately longitudinally of said way, a row of parallel upright letter feeding suction nozzles vertically swingable on and carried by said axis and having their free ends deflected rearwardly with rearwardly opening suction mouths, and means to simultaneously rock said nozzles on said one axis as said axis moves in its path.

26. In combination, a letter way, mechanism for receiving letters from said way and conveying them upwardly with respect thereto, and letter feeding means for said mechanism comprising a hollow shaft transversely arranged with respect to said way and below its front end, suction nozzles rising from and carried by said shaft and having rearwardly facing discharge mouths in said way, and means for bodily moving said shaft back and forth in a path of movement approximately longitudinally of said way.

27. In combination, a letter way, and means for successively advancing the foremost letter comprising a transverse hollow shaft, arms carrying the same and movable to carry the shaft back and forth in a path of movement longitudinally of the way, suction nozzles opening into and carried by the shaft and arranged transversely thereof and having rearwardly opening suction mouths, means to periodically open and close suction communication between the shaft and nozzles, means to simultaneously rock the nozzles on said shaft, and cams timing and operating said arms and said last mentioned means.

28. In combination, a rotary letter moving, displaying and depositing turret having uniformly spaced projecting exterior letter holders, a letter way, spaced letter guide and stop fingers at the front of the way and between which said holders move upwardly to receive and remove letters advanced to position at the rear side of said fingers, and letter feeding means for successively advancing the foremost letters in said way to the rear side of said fingers and there holding them to be removed by said holders.

29. In combination, a letter way, and means for advancing the foremost letter therein comprising a suction nozzle having a letter engaging mouth piece confined in its open end and freely movable in said end on engagement with the letter to maintain parallelism with the surface of the letter as the nozzle changes its angle with respect thereto.

30. A suction nozzle having an open end, a letter-engaging open suction mouth in said open end, and a transverse axis confining said mouth to the nozzle and on which it is rockable freely independently of the nozzle, substantially as described.

31. In combination, a rotary turret having letter holding means uniformly spaced around the periphery thereof arranged to hold letters at the exterior of the turret and to expose the addressed face of each letter right side up at the display position to the view of the operator, means to periodically halt said turret with a letter exposed at the display position, and means to successively deliver letters in reversed position to said means at the turret letter receiving position.

32. In combination, a rotary turret having letter holding means to remove a letter from a letter receiving station in rear of the turret and move the letter to letter display position at the front of the turret and there expose the addressed face of the letter to the view of the operator and to thereafter deposit the letter at a letter discharge station, operating means for said turret causing said holding means to remove the letters upwardly from said letter receiving station, and feeding and separating means at the rear of the turret to successively deliver letters at said receiving station properly positioned for removal to and display by said turret at said display position.

33. In combination, a rotary turret having uniformly spaced longitudinal bars provided with exterior letter clamps, the turret being open between said bars, means for delivering letters to said clamps, means for rotating said turret step by step, and means for opening and closing said clamps to grasp and release the letters, each clamp being arranged to grasp a letter by one edge only with the letter exposed at the exterior of the turret and arranged radially opposite the space between adjacent bars.

34. In combination, letter conveying means comprising a turret rotatable about a horizontal axis and having means to detachably confine letters to the exterior thereof and to discharge the same successively therefrom, controlling means to cause said letter confining means to clamp the letters at the receiving point and to release the letters at the discharging point, and means rotating said turret step by step to halt the turret and necessarily expose the letters as each letter reaches a letter inspection station.

35. In combination, a rotary turret having letter holding means at uniformly spaced intervals around its circumference, mechanism for successively delivering properly positioned letters to said means at the rear of the turret, operating means to cause said turret to stop and display each letter at the front of the turret, a discharge station, and means causing delivery of the letters at the discharge station.

36. In combination, means to cause deposit of a letter in horizontal position at a discharge station, means for delivering letters successively in vertical position with their addressed faces reversed at a delivery station, a series of uniformly disposed letter holders, means for moving said holders in an endless path past a front display and said delivery and discharge stations, and controlling means for said holders, whereby said holders will successively remove letters from said delivery station and reverse the same and expose their addressed faces to the view of the operator at a front display station and thereafter deposit said letters at the discharge station.

37. In distributing apparatus, a turret rotatable with a step by step movement and having letter holders spaced around its circumferential portion, in combination with printing mechanism having a step by step movement and moving with said turret and comprising a rotary member having impression surfaces registering with the letters carried by said holders as they reach the printing position and a printing member successively registering with said surfaces as they reach the printing position.

38. In distributing apparatus, a rotary turret for successively taking letters from a common source and delivering the same to distributing mechanism, said turret having means to grasp each letter by its edge portion leaving the remainder of each letter unobstructed, said turret being hollow and rotating with a step by step movement, in combination, with printing mechanism having a step by step movement and driven with said turret and comprising a rotary printing member and a rotary platen member having impression surfaces, one of said members being arranged within the turret and the other and cooperating member arranged at the exterior of the turret, substantially as described.

39. In distributing apparatus, a rotatable turret having letter holders spaced around its circumferential portion, in combination with printing mechanism timed to movement with said turret and comprising a rotary platen member successively registering with the letters carried by said holders as they reach the printing position and a printing member also successively registering with said letters as they reach the printing position.

40. In distributing apparatus, a rotary turret for successively taking letters from a common source and delivering the same to distributing mechanism, said turret having means to grasp each letter by its edge portion leaving the remainder of each letter unobstructed, said turret being hollow, in combination with printing mechanism timed to move with said turret and comprising a rotary printing member and a rotary platen member, one of said members being arranged within the turret and the other and cooperating member arranged at the exterior of the turret, substantially as described.

41. In combination, letter conveying means comprising a turret rotatable about a horizontal axis and having means to detachably confine letters to the exterior thereof and to discharge the same successively therefrom, means for controlling the discharge of letters from said turret, and keyboard-controlled means for rotating said turret step by step to halt the turret and necessarily expose the letters as each letter reaches a letter inspection station.

In testimony whereof I affix my signature in presence of two witnesses.

ARTHUR J. BRIGGS.

Witnesses:
EARL S. BOYNTON,
H. A. CARHART.